United States Patent
Hsiao et al.

(10) Patent No.: US 11,415,200 B2
(45) Date of Patent: Aug. 16, 2022

(54) TORQUE-VARIABLE SINGLE-SHAFT ROTARY SHAFT STRUCTURE WITH MULTIPLE FRICTIONAL PAIRS

(71) Applicant: FOSITEK CORPORATION, New Taipei (TW)

(72) Inventors: Chin-Yu Hsiao, New Taipei (TW); Ci-Syuan Wong, New Taipei (TW)

(73) Assignee: Fositek Corp., New Taipei (TW)

( * ) Notice: Subject to any disclaimer, the term of this patent is extended or adjusted under 35 U.S.C. 154(b) by 0 days.

(21) Appl. No.: 17/069,075

(22) Filed: Oct. 13, 2020

(65) Prior Publication Data
US 2022/0018423 A1    Jan. 20, 2022

(30) Foreign Application Priority Data
Jul. 16, 2020 (TW) .................................. 109124121

(51) Int. Cl.
*E05F 1/08* (2006.01)
*F16H 13/02* (2006.01)
*F16H 13/14* (2006.01)
*E05D 3/02* (2006.01)
*E05D 11/08* (2006.01)

(52) U.S. Cl.
CPC .............. *F16H 13/02* (2013.01); *E05D 3/02* (2013.01); *E05D 11/087* (2013.01); *F16H 13/14* (2013.01)

(58) Field of Classification Search
CPC ........... Y10T 16/511; Y10T 16/540345; Y10T 16/540255; Y10T 16/5387; Y10T 16/5403; Y10T 16/53828; Y10T 16/53838; Y10T 16/53888; E05D 3/02; E05D 11/06; E05D 11/084; E05D 11/087; E05D 11/1028;
(Continued)

(56) References Cited

U.S. PATENT DOCUMENTS 5,970,819 A * 10/1999 Katoh .................. G06F 1/1681
74/531
7,219,393 B2 * 5/2007 Kida ..................... G06F 1/1616
16/221
(Continued)

FOREIGN PATENT DOCUMENTS

JP   2005147324 A  *  6/2005
JP   2010060059 A  *  3/2010
(Continued)

*Primary Examiner* — Chuck Y Mah
(74) *Attorney, Agent, or Firm* — Rosenberg, Klein & Lee (57) ABSTRACT

A torque-variable single-shaft rotary shaft structure with multiple frictional pairs includes a pivot shaft. A first support is secured to a pivot shaft and a second support is disposed on the pivot shaft. An adjustment wheel assembly, a frictional assembly and an elastic assembly are fitted on the pivot shaft. The adjustment wheel assembly and the frictional assembly have a first adjustment wheel and a second frictional member synchronously movable with the first support and a second adjustment wheel and a first frictional member synchronously movable with the second support. When the first and second supports are rotated, the first and second adjustment wheels are driven to contact and abut against each other so as to provide axial action forces. The frictional assembly has multiple first and second frictional members, which are alternately arranged in frictional contact with each other to form multiple frictional pairs.

19 Claims, 9 Drawing Sheets

(58) Field of Classification Search
CPC ............... G06F 1/1616; G06F 1/1681; E05Y 2900/606; F16H 13/02; F16H 13/14
See application file for complete search history.

(56) References Cited

U.S. PATENT DOCUMENTS

| | | | | |
|---|---|---|---|---|
| 7,251,129 | B2* | 7/2007 | Lee | G06F 1/162 16/330 |
| 7,520,026 | B1* | 4/2009 | Lin | E05D 11/06 16/337 |
| 7,533,446 | B1* | 5/2009 | Lin | G06F 1/1616 16/303 |
| 7,536,749 | B2* | 5/2009 | Lu | G06F 1/1616 16/330 |
| 7,631,398 | B1* | 12/2009 | Lin | G06F 1/1616 16/303 |
| 7,784,154 | B2* | 8/2010 | Chen | G06F 1/1681 16/342 |
| 7,870,644 | B2* | 1/2011 | Chang | H04M 1/0216 16/337 |
| 8,015,668 | B2* | 9/2011 | Wang | G06F 1/1681 16/338 |
| 2005/0278895 | A1* | 12/2005 | Su | G06F 1/1616 16/340 |
| 2007/0169312 | A1* | 7/2007 | Ho | G06F 1/1681 16/330 |
| 2007/0174996 | A1* | 8/2007 | Lu | G06F 1/1616 16/340 |
| 2007/0199179 | A1* | 8/2007 | Wang | G06F 1/1681 16/340 |
| 2009/0320243 | A1* | 12/2009 | Wang | G06F 1/1616 16/303 |
| 2010/0293750 | A1* | 11/2010 | Chiang | G06F 1/1681 16/297 |
| 2011/0099759 | A1* | 5/2011 | Chang | G06F 1/1681 16/331 |
| 2011/0179600 | A1* | 7/2011 | Chang | G06F 1/1681 16/342 |
| 2011/0232035 | A1* | 9/2011 | Huang | G06F 1/1681 16/303 |
| 2014/0368996 | A1* | 12/2014 | Tsao | G06F 1/1616 361/679.55 |

FOREIGN PATENT DOCUMENTS

| | | |
|---|---|---|
| JP | 2011231923 A | 11/2011 |
| TW | M469394 U | 1/2014 |

* cited by examiner

TORQUE-VARIABLE SINGLE-SHAFT ROTARY SHAFT STRUCTURE WITH MULTIPLE FRICTIONAL PAIRS

BACKGROUND OF THE INVENTION

1. Field of the Invention

The present invention relates generally to a torque-variable single-shaft rotary shaft structure with multiple frictional pairs, and more particularly to a rotary shaft structure in which an adjustment wheel assembly, a frictional assembly and an elastic assembly are disposed on one side of one single pivot shaft so as to provide various torque and distribute the normal contact frictional force.

2. Description of the Related Art

Taiwanese Utility Model Patent Publication No. M460177 discloses a multi-stage torque device of pivot shaft device, including a recessed wheel and a raised wheel serially connected with a pivot shaft of the pivot shaft device under elastic force. The recessed wheel and the raised wheel have forced surfaces opposite to each other. The forced surface of the recessed wheel is at least formed with a first recessed face, a second recessed face and a third recessed face with gradually increased height. The forced surface of the raised wheel is formed with a first raised face and a second raised face separated from each other. The gap between the first and second raised faces is in adaptation to the distance between the recessed faces of the recessed wheel. Guide slopes are respectively formed between the recessed faces of the recessed wheel and two ends of the raised faces of the raised wheel.

The first and second raised faces can be rotated by different angles to bridge over two recessed faces at the same time so as to provide different torque values in different angular positions. However, in practice, in such structure, the torque for pivotal rotation of the pivot shaft device is totally provided by the frictional force produced from the normal elastic force between the recessed wheel and the raised wheel. Therefore, the recessed wheel and the raised wheel are subject to serious wear.

Taiwanese Utility Model Patent Publication No. M444023 discloses a hinge device having a first support, a second support, a washer and a pivot shaft. A first cam structure, a second cam structure and multiple elastic bodies are respectively fitted on two sides of the pivot shaft. In addition, a fastening member is connected with the free end of each of the two sides of the pivot shaft. The second cam is synchronously movable with the second support. The washer is positioned between the second cam and the second support and synchronously movable with the first support. Accordingly, when the first and second supports are pivotally rotated relative to each other, the washer respectively contacts the second cam and the second support to distribute the normal elastic force between the first and second supports so as to reduce the wear of the contacting parts.

However, in the above structure, the first and second supports and the first and second cams are disposed at the middle section of the pivot shaft and the elastic bodies and the fastening member are respectively disposed on two sides of the pivot shaft. Therefore, when the first and second supports are respectively connected with two sections of an electronic device, which are pivotally rotatable relative to each other, two ends of the pivot shaft will respectively outward protrude. Under such circumstance, in the entire design, it must be taken into consideration how to conceal the protruding end sections of the pivot shaft. This limits the application and design.

It is therefore tried by the applicant to provide a torque-variable single-shaft rotary shaft structure with multiple frictional pairs to solve the above problems existing in the torque device of the conventional pivot shaft device.

SUMMARY OF THE INVENTION

It is therefore a primary object of the present invention to provide a torque-variable single-shaft rotary shaft structure with multiple frictional pairs, which includes a pivot shaft. A first support is secured to one end of the pivot shaft and a second support is pivotally disposed on the pivot shaft. An adjustment wheel assembly and a frictional assembly are fitted on one end of the pivot shaft distal from the first support. The adjustment wheel assembly and the frictional assembly respectively have a first adjustment wheel and a second frictional member synchronously movable with the first support and a second adjustment wheel and a first frictional member synchronously movable with the second support. When the first and second supports are relatively pivotally rotated, the first and second adjustment wheels are driven to contact and abut against each other by different parts so as to provide various axial action forces for the frictional assembly, whereby after the first and second supports are relatively pivotally rotated, the first and second supports can be located by a necessary angle. Also, the frictional assembly has multiple first and second frictional members, which are alternately arranged in frictional contact with each other for effectively distributing the normal action force between the first and second adjustment wheels so as to reduce the wear thereof.

It is a further object of the present invention to provide the above torque-variable single-shaft rotary shaft structure with multiple frictional pairs, in which an elastic assembly is fitted on one end of the pivot shaft distal from the first support. The elastic assembly serves to elastically fasten the adjustment wheel assembly and the frictional assembly, whereby a proper elastic normal action force is kept between the first and second adjustment wheels and the first and second frictional members. The adjustment wheel assembly, the frictional assembly and the elastic assembly are all disposed on an end section of the pivot shaft (distal from the first support). Therefore, the total structure is properly minified and in design, the above respective assemblies can be easily received inside the electronic device without being exposed to outer side. This can enhance the texture of the product as a whole.

To achieve the above and other objects, the torque-variable single-shaft rotary shaft structure with multiple frictional pairs of the present invention includes: a pivot shaft, two ends of the pivot shaft being respectively formed with a connection section and a pivotal section; a first support connected on the connection section, whereby the first support is synchronously pivotally rotatable with the pivot shaft; a second support pivotally rotatably fitted on the pivotal section; an adjustment wheel assembly disposed on the pivotal section, the adjustment wheel assembly having a first adjustment wheel synchronously movable with the pivot shaft and a second adjustment wheel synchronously movable with the second support, the first and second adjustment wheels being respectively pivotally rotatable along with the first and second supports relative to each other, whereby at different stages of pivotal rotation, the first and second adjustment wheels provide different axial fastening effects for a frictional assembly, the frictional assembly being disposed on the pivotal section, the frictional assembly having at least two second frictional members synchronously movable with the pivot shaft and at least two first frictional members synchronously movable with the second support, the first and second frictional members being alternately arranged in frictional contact with each other; and an elastic assembly disposed on the pivotal section, the elastic assembly serving to provide an elastic force in axial direction of the pivot shaft so as to provide elastically fastening action force for the adjustment wheel assembly and the frictional assembly.

In the above torque-variable single-shaft rotary shaft structure with multiple frictional pairs, the first and second adjustment wheels are respectively formed with raised face and recessed face in cooperation with each other. A periphery of the recessed face is formed with at least one set of multiple recessed plane faces proximal to the raised face. The multiple recessed plane faces are arranged as stages. A periphery of the raised face is formed with at least one raised section proximal to the recessed face, whereby when the raised face and the recessed face are pivotally rotated relative to each other, the raised section can respectively abut against the recessed plane faces so as to produce axial fastening effect to different extents.

In the above torque-variable single-shaft rotary shaft structure with multiple frictional pairs, slopes are formed between the recessed plane faces to connect therewith.

In the above torque-variable single-shaft rotary shaft structure with multiple frictional pairs, the recessed face is formed with multiple sets of multiple recessed plane faces arranged as stages. The raised face is formed with multiple symmetrical raised sections, whereby when the raised face and the recessed face are pivotally rotated relative to each other, the raised sections can respectively synchronously abut against the corresponding symmetrical recessed plane faces.

In the above torque-variable single-shaft rotary shaft structure with multiple frictional pairs, at least one plane cut face is formed on a circumference of the pivotal section of the pivot shaft. A center of the first adjustment wheel is formed with a slot with a cross-sectional configuration identical to that of the pivotal section. A center of each second frictional member is formed with a slot with a cross-sectional configuration identical to that of the pivotal section, whereby the first adjustment wheel and the second frictional member can be fitted on the pivotal section to synchronously move therewith.

In the above torque-variable single-shaft rotary shaft structure with multiple frictional pairs, the second adjustment wheel is formed with a connecting section extending to the second support. The connecting section is connected with a corresponding connected section formed on the second support, whereby the second adjustment wheel is synchronously movable with the second support.

In the above torque-variable single-shaft rotary shaft structure with multiple frictional pairs, the frictional assembly is positioned between the adjustment wheel assembly and the second support. The first frictional member has a circular hole pivotally rotatably fitted on the pivotal section and a perforation fitted on the connecting section, whereby the first frictional member and the second support and the second adjustment wheel are synchronously movable with each other.

In the above torque-variable single-shaft rotary shaft structure with multiple frictional pairs, the first frictional member of the frictional assembly in adjacency to one side of the second adjustment wheel is integrally formed on one side of one of the first and second adjustment wheels as a frictional face in frictional contact with an adjacent second frictional member.

In the above torque-variable single-shaft rotary shaft structure with multiple frictional pairs, the elastic assembly is disposed on one side of the adjustment wheel assembly distal from the connection section. A fixing member is connected with one end of the pivotal section distal from the connection section to stop the elastic assembly.

In the above torque-variable single-shaft rotary shaft structure with multiple frictional pairs, the elastic assembly is composed of multiple recessed and raised elastic plates pivotally fitted on the pivotal section opposite to each other.

In the above torque-variable single-shaft rotary shaft structure with multiple frictional pairs, the first support is connected with a part of an electronic device and the second support is connected with another part of the electronic device.

The present invention can be best understood through the following description and accompanying drawings, wherein:

DETAILED DESCRIPTION OF THE PREFERRED EMBODIMENTS

Please refer to FIGS. 1 to 4. The main structure of the present invention includes a pivot shaft 1, a first support 2, a second support 3, an adjustment wheel assembly 4, a frictional assembly 5 and an elastic assembly 6. Two ends of the pivot shaft 1 are respectively formed with a connection section 11 and a pivotal section 12.

Figure 1:
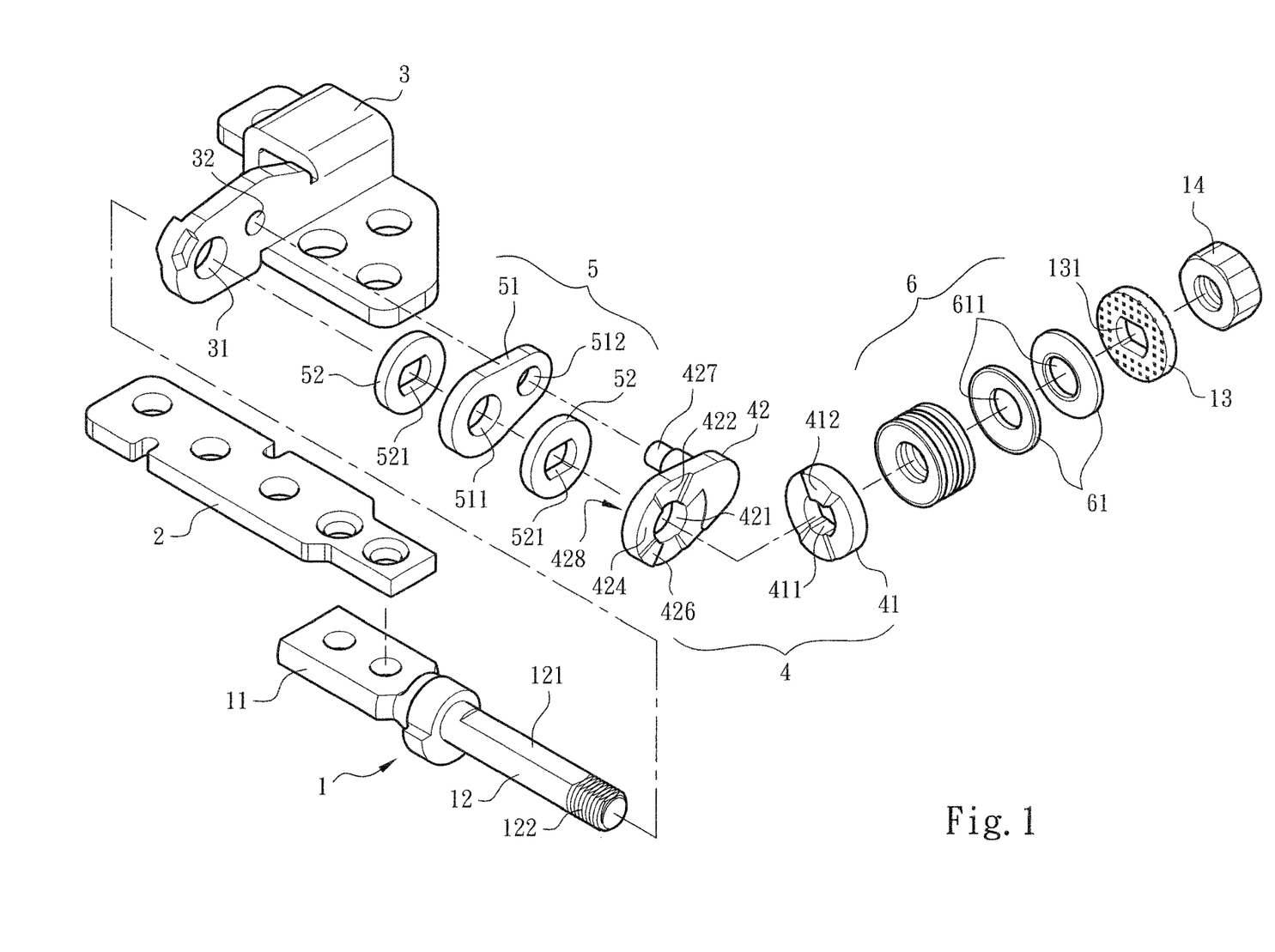
FIG. 1 is a perspective exploded view of the present invention.

In a preferred embodiment, at least one plane cut face 121 is formed on the circumference of the pivotal section 12. In addition, an outer thread 122 is formed on one end of the pivotal section 12 distal from the connection section 11. A fixing member 14 with a threaded hole 141, (such as a nut) can be screwed on the outer thread 122.

The first support 2 is securely connected on the connection section 11, whereby the first support 2 can be synchronously pivotally rotated with the pivot shaft 1. In practice, the first support 2 can be connected with a part (such as a case main body) of an electronic device (not shown).

The second support 3 has a circular hole 31 pivotally rotatably fitted on the pivotal section 12. The second support 3 can be connected with another part (such as a screen) of the electronic device, which is pivotally rotatable relative to the case main body.

In a preferred embodiment, the second support 3 is formed with at least one connected section 32, (which can be a hole).

The adjustment wheel assembly 4 is disposed on the pivotal section 12. The adjustment wheel assembly 4 includes a first adjustment wheel 41 synchronously movable with the pivot shaft 1 and a second adjustment wheel 42 synchronously movable with the second support 3. The first and second adjustment wheels 41, 42 can be pivotally rotated along with the first and second supports 2, 3 relative to each other. Different parts of the first and second adjustment wheels 41, 42 are in frictional contact with each other, whereby various frictional resistances against the rotation can be correspondingly produced.

Figure 2:
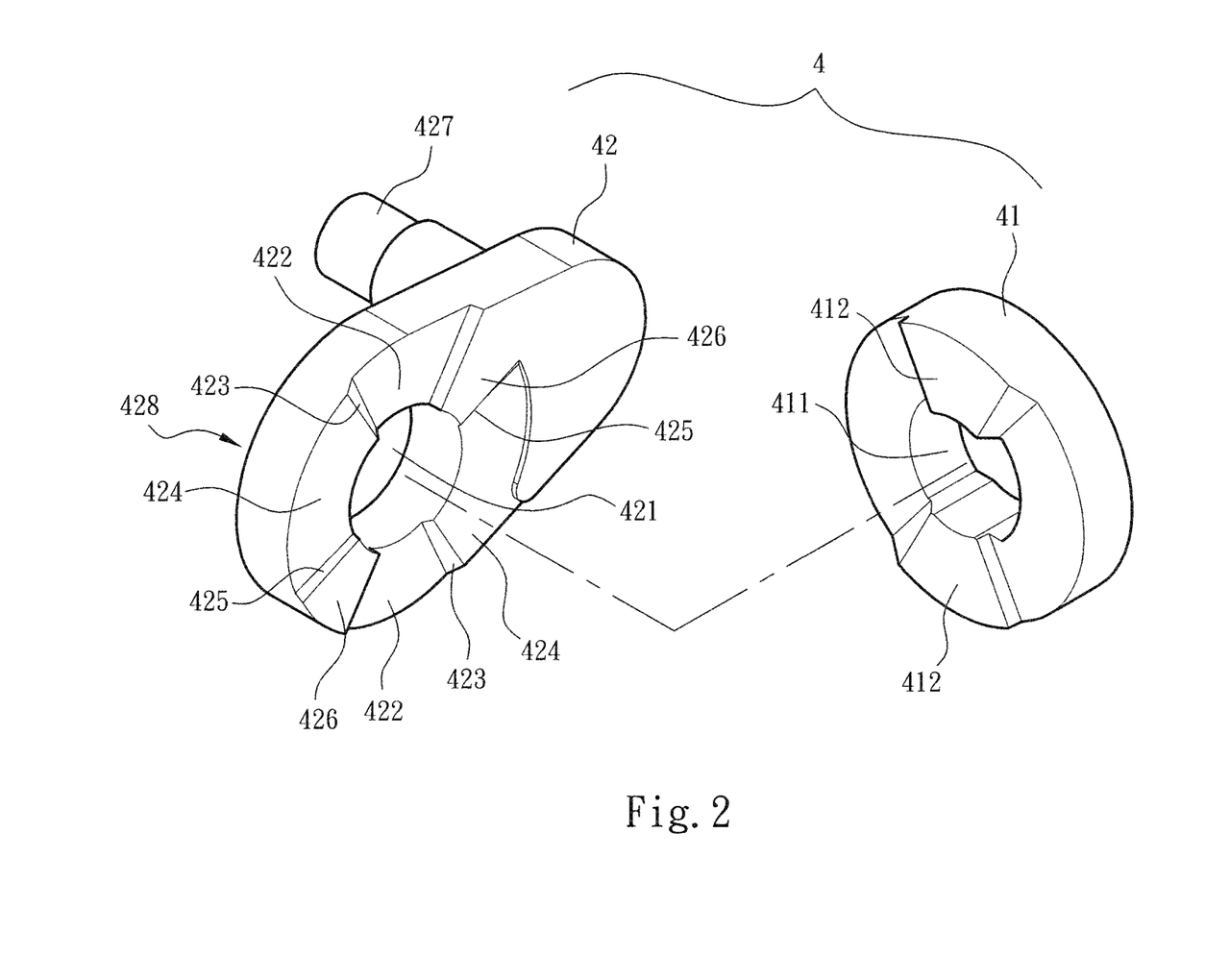
FIG. 2 is an enlarged perspective view of the first and second adjustment wheels of FIG. 1.
Figure 3:
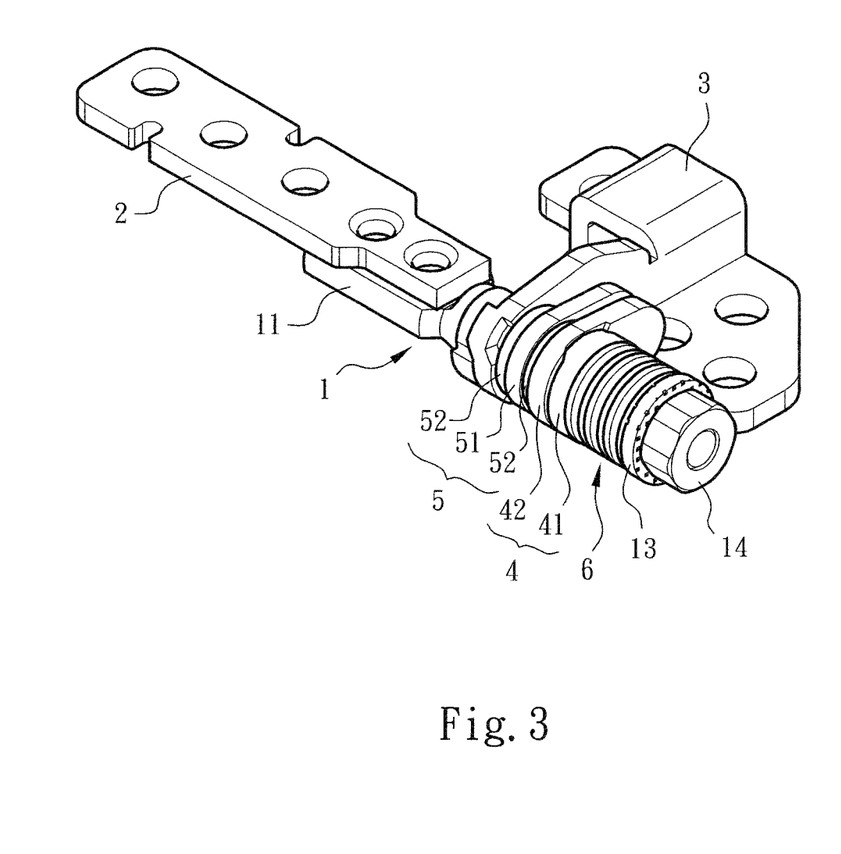
FIG. 3 is a perspective assembled view of the present invention.

In a preferred embodiment, a raised face (or a recessed face) is formed on one side of the first adjustment wheel 41 proximal to the second adjustment wheel 42. The center of the first adjustment wheel 41 is formed with a slot 411 with a cross-sectional configuration identical to that of the pivotal section 12. A recessed face (or a raised face) is formed on one side of the second adjustment wheel 42 proximal to the first adjustment wheel 41. The center of the second adjustment wheel 42 is formed with a circular hole 421, which is pivotally rotatably fitted on the pivotal section 12. In addition, the second adjustment wheel 42 is formed with a connecting section 427 extending to the second support 3, (which can be a boss). The connecting section 427 can be connected with (inserted into) the connected section 32 (the hole), whereby the second adjustment wheel 42 is synchronously movable with the support 3.

In the above structure, the periphery of the recessed face is formed with multiple sets of first recessed plane faces 422, second recessed plane faces 424 and third recessed plane faces 426 proximal to the raised face. The first, second and third recessed plane faces 422, 424, 426 are arranged as stages and first and second slopes 423, 425 are formed between the first, second and third recessed plane faces 422, 424, 426 to connect therewith. The periphery of the raised face is formed with at least one raised section 412 proximal to the recessed face. When the raised face and the recessed face are pivotally rotated relative to each other, the raised section 412 can respectively abut against the first, second and third recessed plane faces 422, 424, 426 in different positions so as to produce different axial action forces.

In practice, as necessary, the recessed face can be formed with multiple sets of first, second and third recessed plane faces 422, 424, 426 and first and second slopes 423, 425, which are symmetrically arranged. The raised face is also formed with multiple symmetrical raised sections 412. When the raised face and the recessed face are pivotally rotated relative to each other, the raised sections 412 can respectively synchronously abut against the first, second and third recessed plane faces 422, 424, 426 in symmetrical positions. Accordingly, by means of multi-point contact, the contact faces of the raised face and the recessed face can keep balanced and stable (without deflection).

The frictional assembly 5 has at least two second frictional members 52 synchronously movable with the pivot shaft 1 and at least two first frictional members 51 synchronously movable with the second support 3. The first and second frictional members 51, 52 are alternately arranged in frictional contact with each other.

Figure 4:
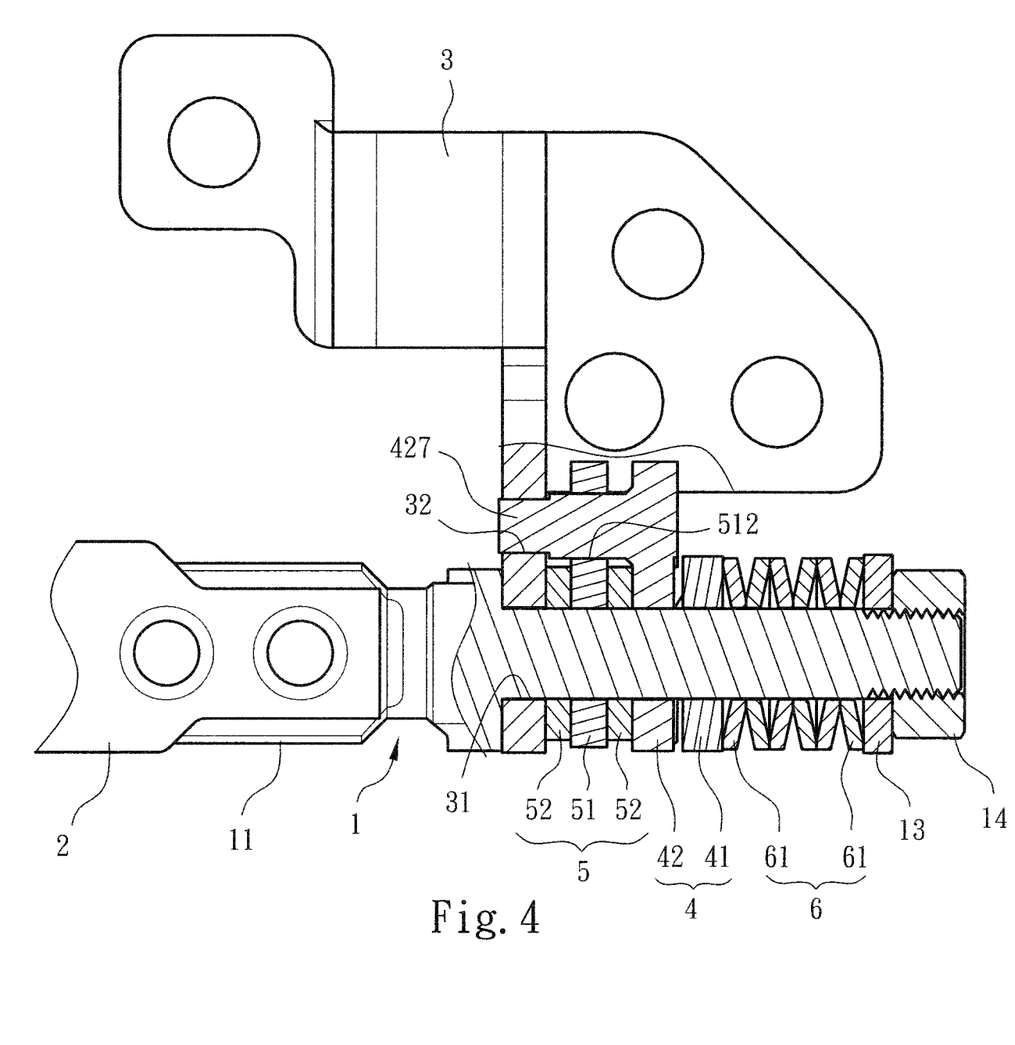
FIG. 4 is a plane assembled sectional view of the present invention.

In a preferred embodiment, the frictional assembly 5 is positioned between the adjustment wheel assembly 4 and the second support 3. Each first frictional member 51 has a circular hole 511 pivotally rotatably fitted on the pivotal section 12 and a perforation 512 fitted on the connecting section 427. Accordingly, the first frictional member 51 and the second support 3 and the second adjustment wheel 42 are synchronously movable with each other. The center of each second frictional member 52 is formed with a slot 521 with a cross-sectional configuration identical to that of the pivotal section 12. The slot 521 is fitted on the pivotal section 12 to synchronously move therewith.

In practice, the first frictional member 51 of the frictional assembly 5 in adjacency to one side of the second adjustment wheel 42 can be integrally formed on one side of the second adjustment wheel 42 proximal to the frictional assembly 5 as a frictional face 428 in frictional contact with the adjacent second frictional member 52. This can simplify the entire structure and lower the manufacturing cost.

The elastic assembly 6 is disposed on the pivotal section 12 to provide an elastic force in axial direction of the pivot shaft 1 so as to elastically fasten the adjustment wheel assembly 4 and the frictional assembly 5.

In a preferred embodiment, the elastic assembly 6 is disposed on one side of the adjustment wheel assembly 4 distal from the connection section 11. The elastic assembly 6 is composed of multiple recessed and raised elastic plates 61 opposite to each other. The center of each of the recessed and raised elastic plates 61 is formed with a circular hole 611 pivotally fitted on the pivotal section 12. In addition, as necessary, a washer 13 can be positioned between the elastic assembly 6 and the fixing member 14. The center of the washer 13 is formed with a slot 131 with a cross-sectional configuration identical to that of the pivotal section 12. The washer 13 serves to stop the elastic member 6.

Figure 5:
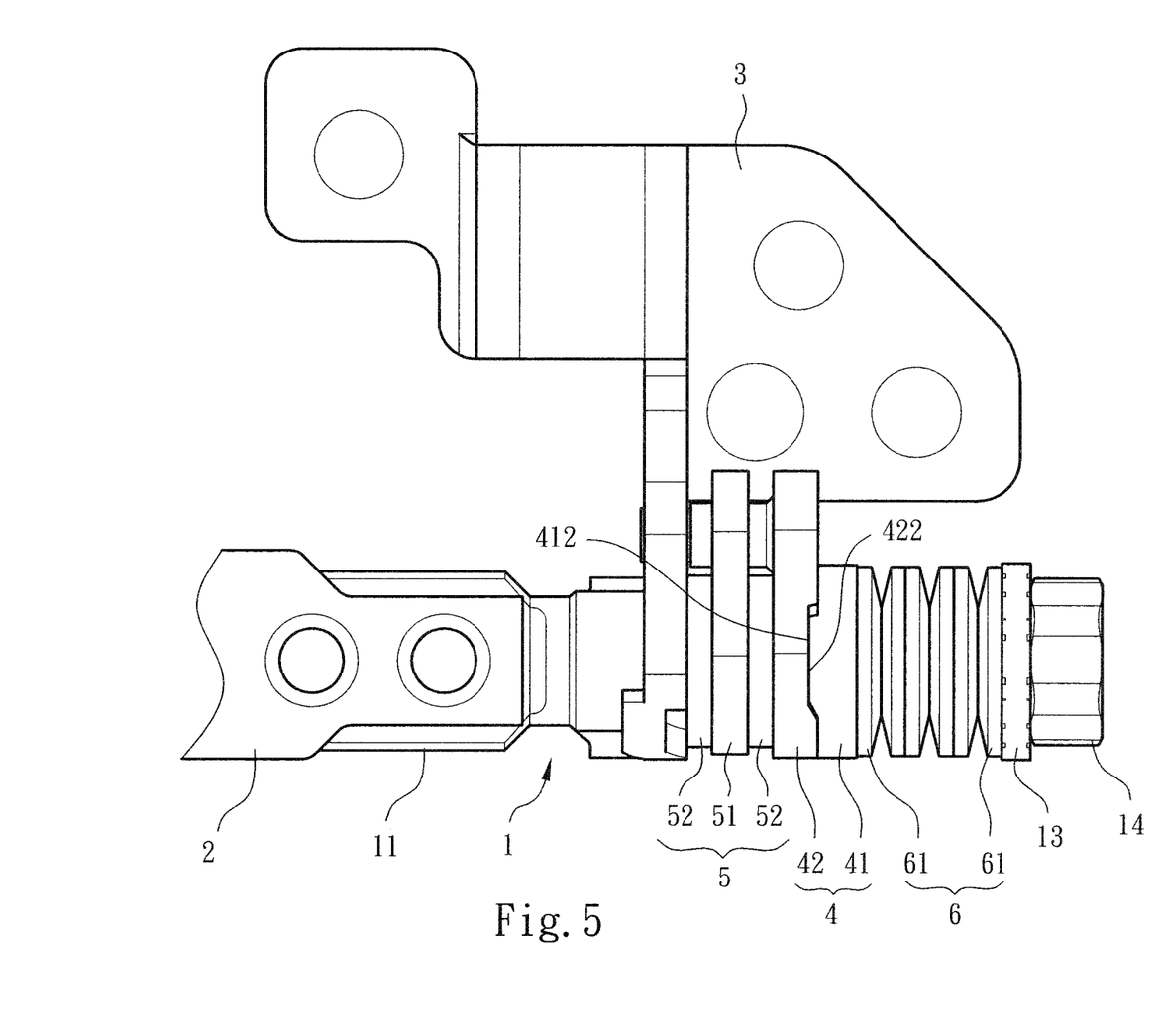
FIG. 5 is a view according to FIG. 4, in which the first and second supports are positioned in a closed position and the raised section abuts against the first recessed plane face.

Please refer to FIGS. 5 to 9. In operation of the present invention, when the first and second supports 2, 3 are positioned in an initial closed position, the raised section 412 of the first adjustment wheel 41 extends into the lowest first recessed plane face 422 of the second adjustment wheel 42. At this time, the raised section 412 is in contact with the first recessed plane face 422 in an unforced state (as shown in FIG. 5). Therefore, there is no resistance against the pivotal rotation between the first and second supports 2, 3. Therefore, before starting to use the electronic device, a proper gap is defined between the two parts (the case main body and the screen) connected with the first and second supports 2, 3 and a finger can extend into the gap to successively turn open the electronic device.

Figure 6:
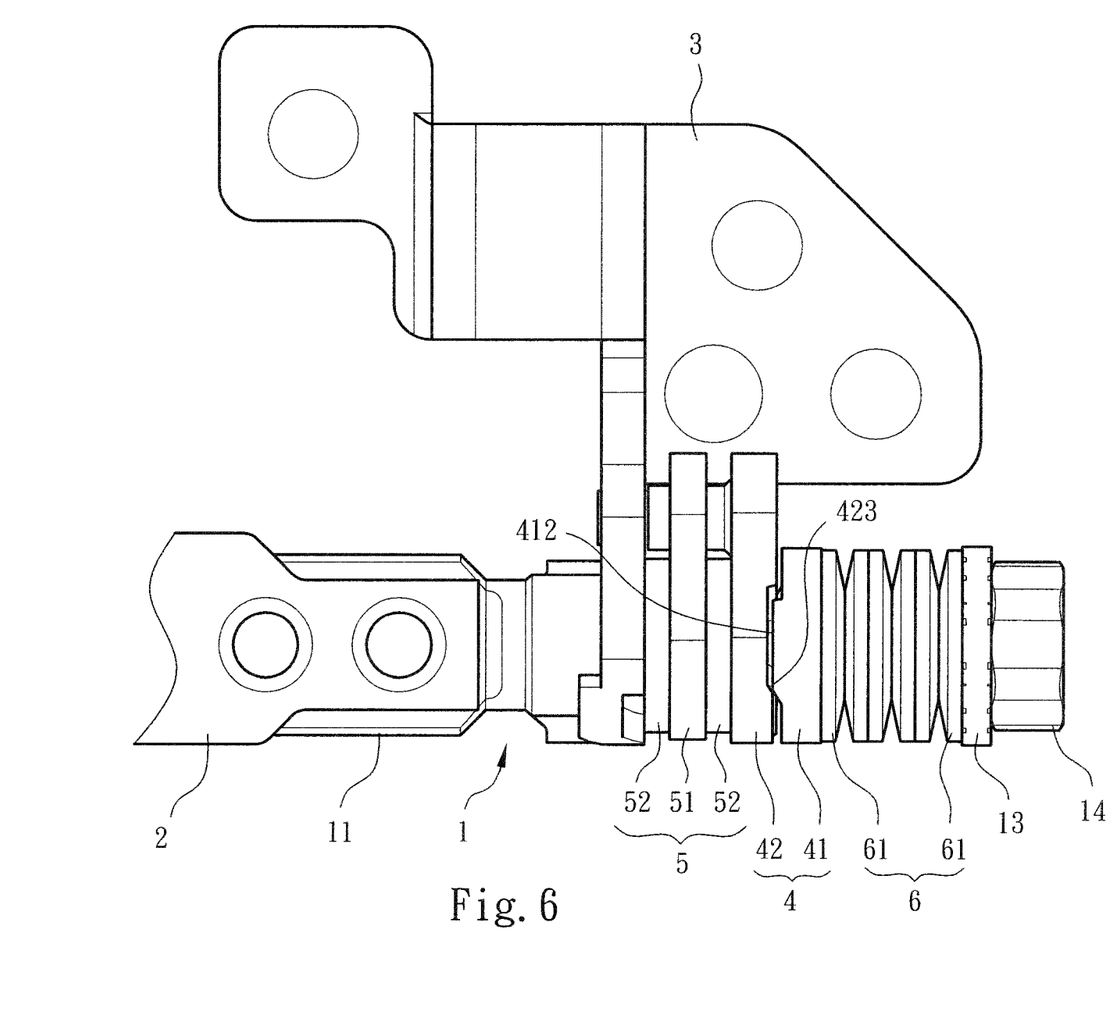
FIG. 6 is a view according to FIG. 4, in which the first and second supports are opened at a first stage and the raised section slides along a first slope.

When the first and second supports 2, 3 are relatively pivotally rotated to a first stage, the raised section 412 starts to slide along the first slope 423 to the second recessed plane face 424. Accordingly, the axial action force applied by the adjustment wheel assembly 4 to the frictional assembly 5 is gradually increased. By means of the frictional force between the multiple sets of first and second frictional members 51, the frictional resistance against the pivotal rotation between the first and second supports 2, 3 is gradually increased (as shown in FIG. 6). At this time, the first and second supports 2, 3 can be easily turned open.

Figure 7:
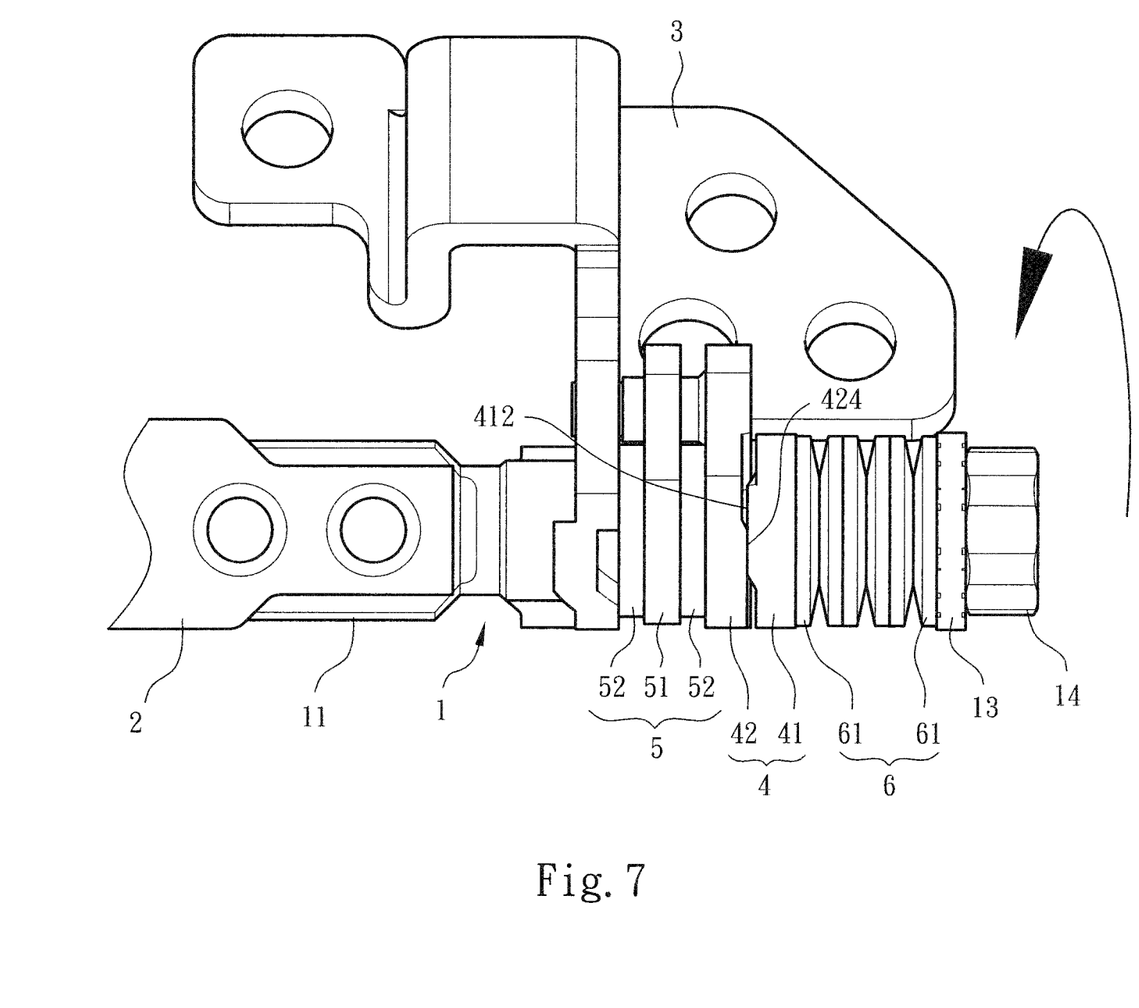
FIG. 7 is a view according to FIG. 4, in which the first and second supports are opened at a second stage and the raised section abuts against the second recessed plane face.

When the first and second supports 2, 3 are relatively pivotally rotated to a second stage, after the raised section 412 moves to the second recessed plane face 424 (as shown in FIG. 7), the axial action force applied by the adjustment wheel assembly 4 to the frictional assembly 5 is kept with a lower constant value. In addition, by means of the frictional force between the multiple sets of first and second frictional members 51, 52, under the lower frictional resistance against the pivotal rotation between the first and second supports 2, 3, the necessary pivotal rotation torque is lower. Therefore, the screen can be turned open and located in any position for convenient use (without falling back to cover the case main body due to its own weight). Also, the opening angle of the screen can be easily adjusted as necessary.

Figure 8:
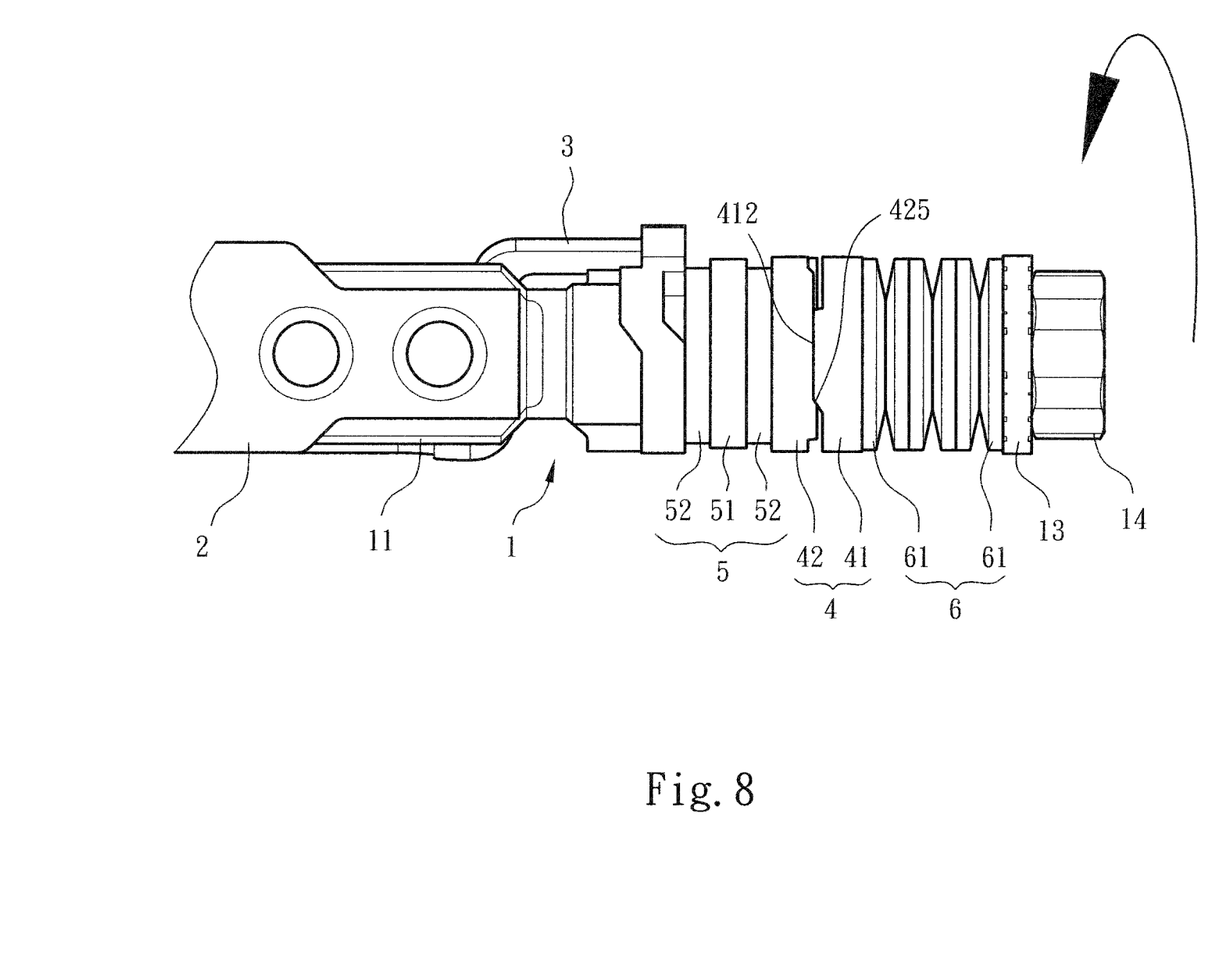
FIG. 8 is a view according to FIG. 4, in which the first and second supports are opened at a third stage and the raised section slides along a second slope.

When the first and second supports 2, 3 are further pivotally rotated to a third stage, the raised section 412 slides along the second slope 425 to the third recessed plane face 426 (as shown in FIG. 8). Accordingly, the axial action force applied by the adjustment wheel assembly 4 to the frictional assembly 5 is further gradually increased. By means of the frictional force between the multiple sets of first and second frictional members 51, 52, the frictional resistance against the pivotal rotation between the first and second supports 2, 3 is further gradually increased. At this time, the first and second supports 2, 3 cannot be easily pivotally rotated so that the screen is prevented from being over-turned open by an excessively large angle.

Figure 9:
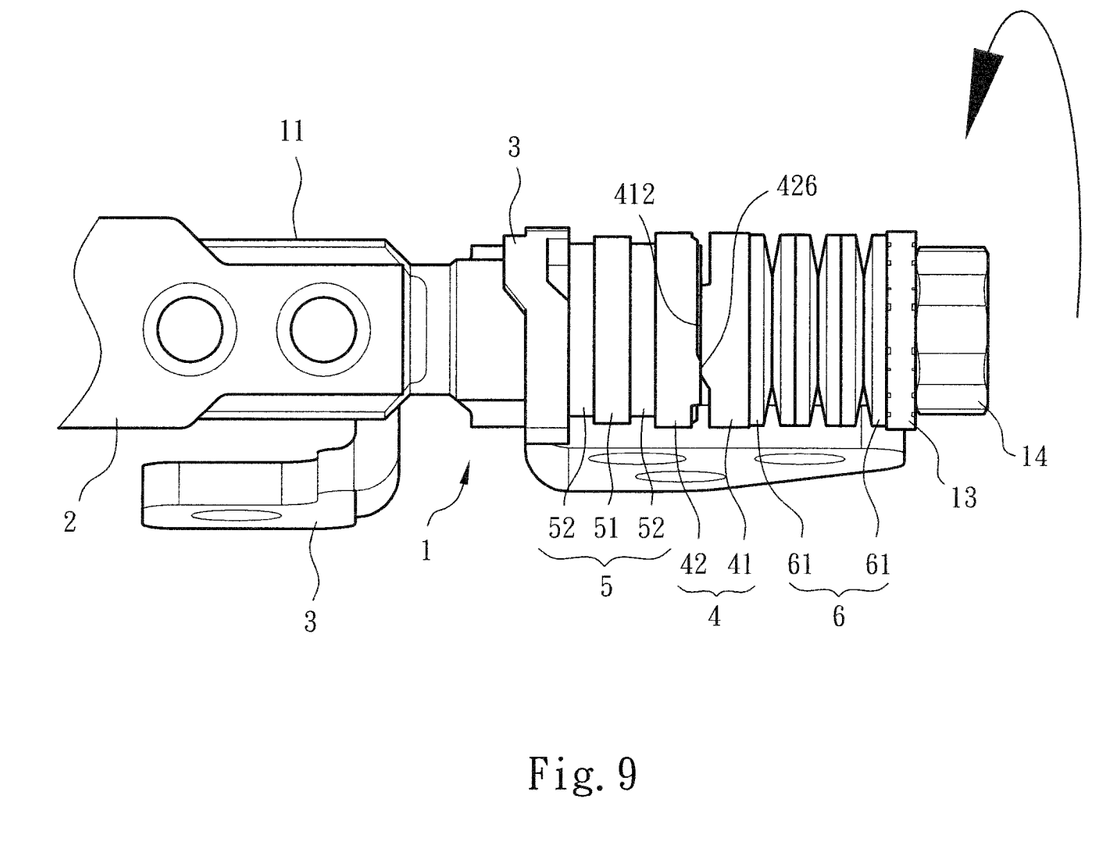
FIG. 9 is a view according to FIG. 4, in which the first and second supports are opened at a fourth stage and the raised section abuts against the third recessed plane face.

When the first and second supports 2, 3 are continuously pivotally rotated to a fourth stage, after the raised section 412 moves to the third recessed plane face 426 (as shown in FIG. 9), the axial action force applied by the adjustment wheel assembly 4 to the frictional assembly 5 is kept with a higher constant value. In addition, by means of the frictional force between the multiple sets of first and second frictional members 51, 52, under the higher frictional resistance against the pivotal rotation between the first and second supports 2, 3, the necessary pivotal rotation torque is higher. Therefore, the case main body and the screen are kept in a stable state without easy shaking and the difficulty in pivotally rotating the first and second supports 2, 3 is properly increased, whereby the screen is further prevented from being over-turned open by an excessively large angle.

In the present invention, by means of the raised section 412 elastically abutting against the first, second and third recessed plane faces 422, 424, 426 by different depths, the frictional assembly 5 is fastened to different extents so as to provide different frictional resistance between the first and second supports 2, 3 in accordance with different torque (resistance) necessary for using the electronic device (such as turning open the screen). Also, by means of the frictional force between the multiple second frictional members 52 pivotally rotatable with the first support 2 and the multiple first frictional members 51 pivotally rotatable with the second support 3, the normal action force (in the axial direction of the pivot shaft 1) applied to the adjustment wheel assembly 4 and the elastic assembly 6 can be distributed so as to effectively reduce the wear of the respective frictional parts.

In the structural design of the present invention, the adjustment wheel assembly 4, the frictional assembly 5 and the elastic assembly 6 are disposed at one end of the pivot shaft 1 so that the length of the pivot shaft 1 is properly shortened and the entire structure is simplified. When assembled with the electronic device, only single side of the pivot shaft 1 (with the above respective assemblies) needs to be concealed. Therefore, the development and design operation of the entire structure is also simplified.

In conclusion, in the torque-variable single-shaft rotary shaft structure with multiple frictional pairs of the present invention, the elastic assembly and the frictional assembly as well as the adjustment wheel assembly are collectively arranged on one side of one single pivot shaft to provide different pivotal rotation torques and distribute the normal contact frictional force. The torque-variable single-shaft rotary shaft structure with multiple frictional pairs of the present invention is novel and advanced.

The above embodiments are only used to illustrate the present invention, not intended to limit the scope thereof. Many modifications of the above embodiments can be made without departing from the spirit of the present invention.

What is claimed is:

1. A torque-variable single-shaft rotary shaft structure with multiple frictional pairs, comprising:
    a pivot shaft, two ends of the pivot shaft being respectively formed with a connection section and a pivotal section;
    a first support connected on the connection section, whereby the first support is synchronously pivotally rotatable with the pivot shaft;
    a second support pivotally rotatably fitted on the pivotal section;
    an adjustment wheel assembly disposed on the pivotal section, the adjustment wheel assembly having a first adjustment wheel synchronously movable with the pivot shaft and a second adjustment wheel synchronously movable with the second support, the first and second adjustment wheels being respectively pivotally rotatable along with the first and second supports relative to each other, whereby at different stages of pivotal rotation, the first and second adjustment wheels provide different axial fastening effects for a frictional assembly, the frictional assembly being disposed on the pivotal section, the frictional assembly including at least two second frictional members synchronously movable with the pivot shaft and at least one first frictional member synchronously movable with the second support, the first and second frictional members being alternately arranged in frictional contact with each other; and
    an elastic assembly disposed on the pivotal section, the elastic assembly serving to provide an elastic force in axial direction of the pivot shaft so as to provide elastically fastening action force for the adjustment wheel assembly and the frictional assembly,
    wherein the first and second adjustment wheels are respectively formed with a raised face and a recessed face in cooperation with each other, a periphery of the recessed face of the first adjustment wheel being formed with at least one set of recessed plane faces proximal to the raised face, the recessed plane faces in each set being arranged to form an ordered series of increasing recession depths, a periphery of the raised face of the second adjustment wheel being formed with at least one raised section proximal to the recessed face of the first adjustment wheel, whereby when the raised face and the recessed face are pivotally rotated relative to each other, the raised section moves in abutting engagement against each of the recessed plane faces so as to produce different respective levels of an axial fastening effect.

2. The torque-variable single-shaft rotary shaft structure with multiple frictional pairs as claimed in claim 1, wherein the recessed plane faces of each set are connected by a slope formed between each adjacent pair of recessed plane faces within the set.

3. The torque-variable single-shaft rotary shaft structure with multiple frictional pairs as claimed in claim 2, wherein at least one plane cut face is formed on a circumference of the pivotal section of the pivot shaft, a center of the first adjustment wheel being formed with a slot with a cross-sectional configuration corresponding to that of the pivotal section, a center of each second frictional member being formed with a slot with a cross-sectional configuration corresponding to that of the pivotal section, whereby the first adjustment wheel and the second frictional member can be fitted on the pivotal section to synchronously move therewith.

4. The torque-variable single-shaft rotary shaft structure with multiple frictional pairs as claimed in claim 3, wherein the second adjustment wheel is formed with a connecting section extending to the second support, the connecting section being connected with a corresponding connected section formed on the second support, whereby the second adjustment wheel is synchronously movable with the second support.

5. The torque-variable single-shaft rotary shaft structure with multiple frictional pairs as claimed in claim 4, wherein the frictional assembly is positioned between the adjustment wheel assembly and the second support, the first frictional member having a circular hole pivotally rotatably fitted on the pivotal section and a perforation fitted on the connecting section, whereby the first frictional member and the second support and the second adjustment wheel are synchronously movable with each other.

6. The torque-variable single-shaft rotary shaft structure with multiple frictional pairs as claimed in claim 5, wherein a frictional face is integrally formed on one side of one of the first and second adjustment wheels and is in frictional contact with an adjacent second frictional member.

7. The torque-variable single-shaft rotary shaft structure with multiple frictional pairs as claimed in claim 2, wherein the second adjustment wheel is formed with a connecting section extending to the second support, the connecting section being connected with a corresponding connected section formed on the second support, whereby the second adjustment wheel is synchronously movable with the second support.

8. The torque-variable single-shaft rotary shaft structure with multiple frictional pairs as claimed in claim 7, wherein the frictional assembly is positioned between the adjustment wheel assembly and the second support, the first frictional member having a circular hole pivotally rotatably fitted on the pivotal section and a perforation fitted on the connecting section, whereby the first frictional member and the second support and the second adjustment wheel are synchronously movable with each other.

9. The torque-variable single-shaft rotary shaft structure with multiple frictional pairs as claimed in claim 8, wherein a frictional face is integrally formed on one side of one of the first and second adjustment wheels and is in frictional contact with an adjacent second frictional member.

10. The torque-variable single-shaft rotary shaft structure with multiple frictional pairs as claimed in claim 1, wherein at least one plane cut face is formed on a circumference of the pivotal section of the pivot shaft, a center of the first adjustment wheel being formed with a slot with a cross-sectional configuration corresponding to that of the pivotal section, a center of each second frictional member being formed with a slot with a cross-sectional configuration corresponding to that of the pivotal section, whereby the first adjustment wheel and the second frictional member can be fitted on the pivotal section to synchronously move therewith.

11. The torque-variable single-shaft rotary shaft structure with multiple frictional pairs as claimed in claim 10, wherein the second adjustment wheel is formed with a connecting section extending to the second support, the connecting section being connected with a corresponding connected section formed on the second support, whereby the second adjustment wheel is synchronously movable with the second support.

12. The torque-variable single-shaft rotary shaft structure with multiple frictional pairs as claimed in claim 11, wherein the frictional assembly is positioned between the adjustment wheel assembly and the second support, the first frictional member having a circular hole pivotally rotatably fitted on the pivotal section and a perforation fitted on the connecting section, whereby the first frictional member and the second support and the second adjustment wheel are synchronously movable with each other.

13. The torque-variable single-shaft rotary shaft structure with multiple frictional pairs as claimed in claim 12, wherein a frictional face is integrally formed on one side of one of the first and second adjustment wheels and is in frictional contact with an adjacent second frictional member.

14. The torque-variable single-shaft rotary shaft structure with multiple frictional pairs as claimed in claim 1, wherein the second adjustment wheel is formed with a connecting section extending to the second support, the connecting section being connected with a corresponding connected section formed on the second support, whereby the second adjustment wheel is synchronously movable with the second support.

15. The torque-variable single-shaft rotary shaft structure with multiple frictional pairs as claimed in claim 14, wherein the frictional assembly is positioned between the adjustment wheel assembly and the second support, the first frictional member having a circular hole pivotally rotatably fitted on the pivotal section and a perforation fitted on the connecting section, whereby the first frictional member and the second support and the second adjustment wheel are synchronously movable with each other.

16. The torque-variable single-shaft rotary shaft structure with multiple frictional pairs as claimed in claim 15, wherein a frictional face is integrally formed on one side of one of the first and second adjustment wheels and is in frictional contact with an adjacent second frictional member.

17. The torque-variable single-shaft rotary shaft structure with multiple frictional pairs as claimed in claim 1 wherein the elastic assembly is disposed on one side of the adjustment wheel assembly distal from the connection section, a fixing member being connected with one end of the pivotal section distal from the connection section to stop the elastic assembly.

18. The torque-variable single-shaft rotary shaft structure with multiple frictional pairs as claimed in claim 17, wherein the elastic assembly is composed of multiple recessed and raised elastic plates pivotally fitted on the pivotal section opposite to each other.

19. The torque-variable single-shaft rotary shaft structure with multiple frictional pairs as claimed in claim 1, wherein the first support is connected with a part of an electronic device and the second support is connected with another part of the electronic device.

* * * * *